(No Model.) 3 Sheets—Sheet 1.
F. G. JOHNSON.
WATER CURRENT MOTOR.
No. 404,488. Patented June 4, 1889.
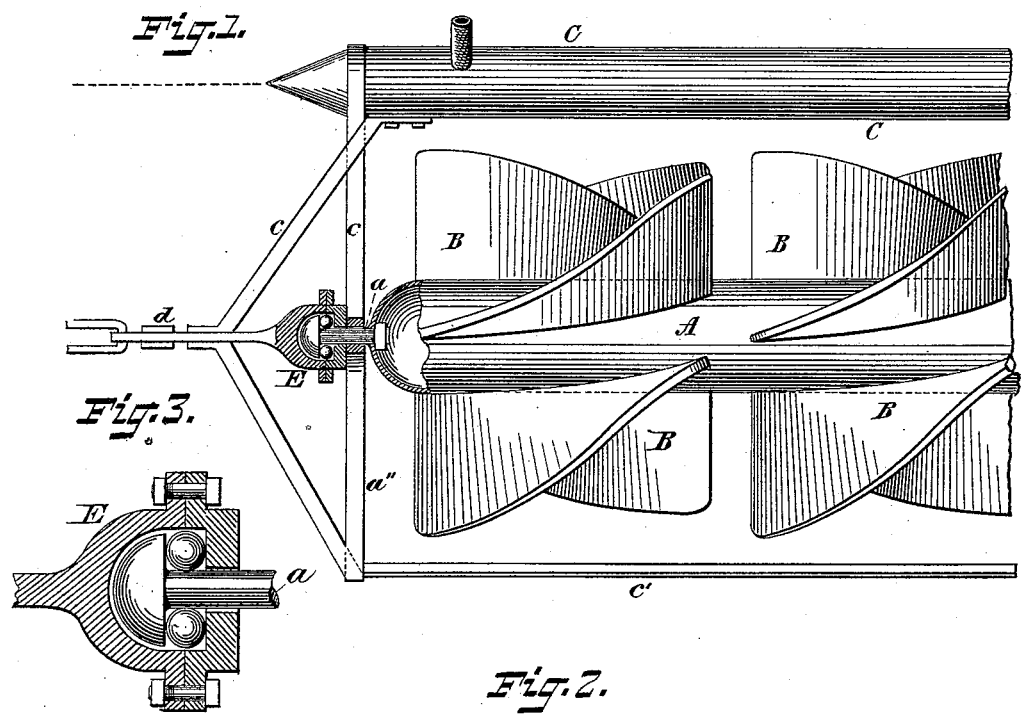
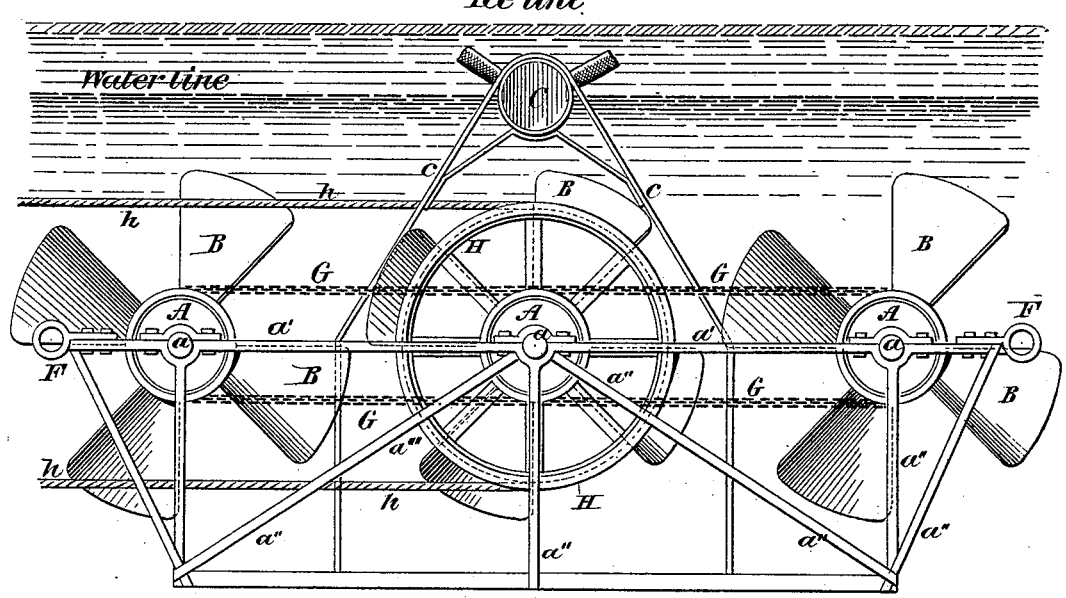
WITNESSES:
Gustave Dieterich
William Goebel
INVENTOR,
Frank G. Johnson

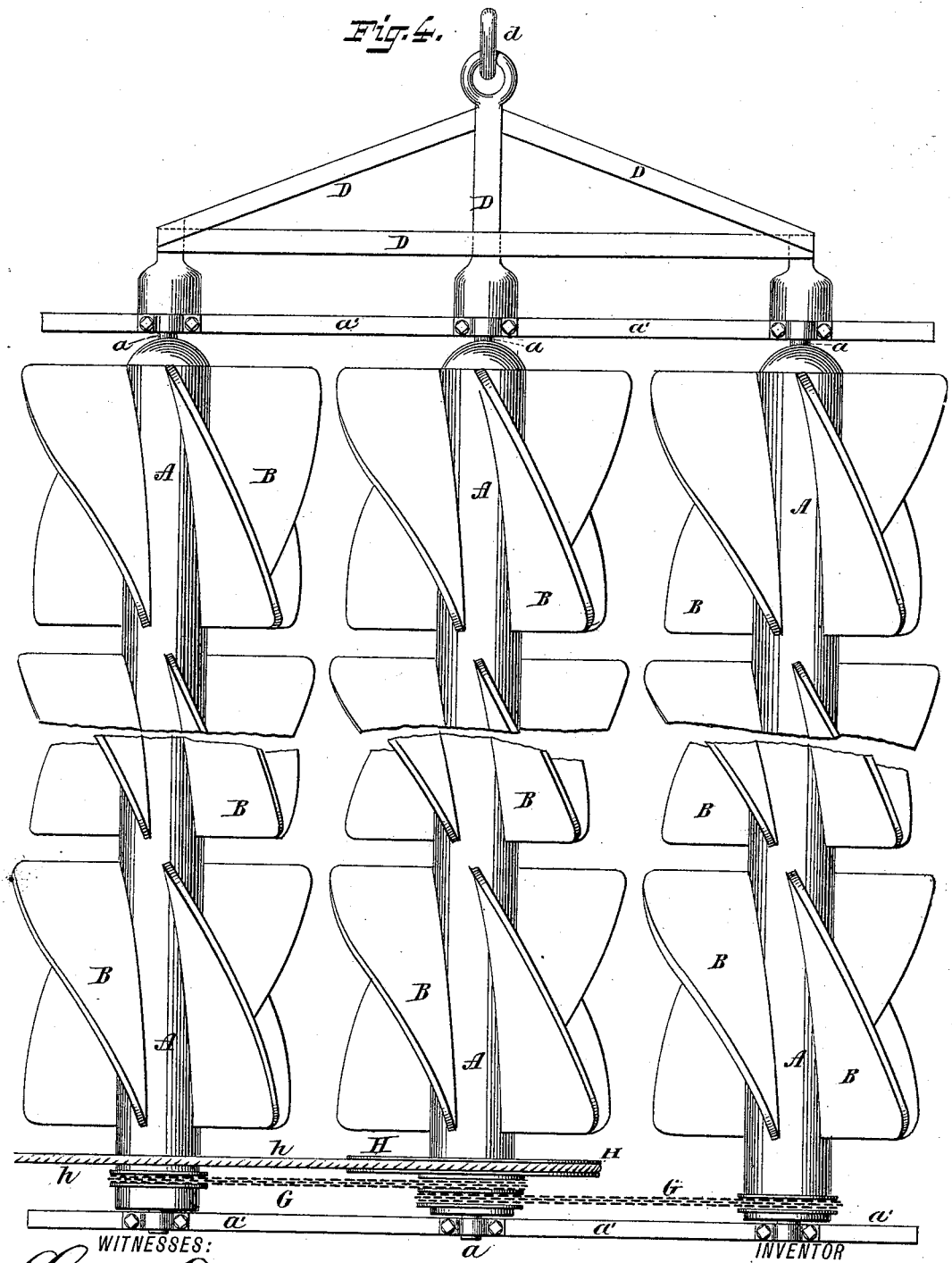

(No Model.) 3 Sheets—Sheet 3.
F. G. JOHNSON.
WATER CURRENT MOTOR.

No. 404,488. Patented June 4, 1889.

WITNESSES: Gustave Dieterich, William Goebel.

INVENTOR, Frank G. Johnson.

UNITED STATES PATENT OFFICE.

FRANK G. JOHNSON, OF NEW YORK, N. Y.

WATER-CURRENT MOTOR.

SPECIFICATION forming part of Letters Patent No. 404,488, dated June 4, 1889.

Application filed March 5, 1888. Serial No. 266,125. (No model.)

*To all whom it may concern:*

Be it known that I, FRANK G. JOHNSON, a citizen of the United States, residing in the city, county, and State of New York, have invented new and useful Improvements in Water-Current Motors, of which the following is a specification.

My invention relates to that class of water-motors which are intended to utilize for motive power the more or less rapid currents of water, whether in natural rivers and creeks, artificial sluices, or elsewhere, and which is so constructed as to float in the water, usually in the upper portion of the stream, or to be lowered, when necessary to do so, to the bottom of the stream, or far enough below the surface to avoid injury to the motor by ice in cold countries, and so constructed that the entire device can be floated to and anchored in any part of the river, where it can remain and operate without the necessity of providing for it any fixed supporting foundation more than that of the buoyant power of the water and a single point of anchorage in the stream, and which, when practicable to do so, may be anchored from opposite points of the shores of the stream. These results I attain by mechanism illustrated in the accompanying drawings, in which—

Figure 5:
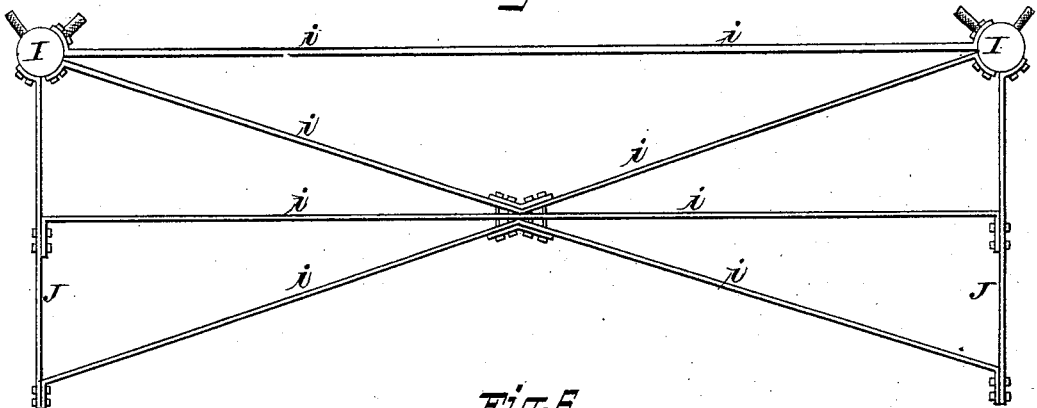

Figure 1 is a vertical longitudinal view; Fig. 2, a rear end view; Fig. 3, an enlarged detail view of a ball-joint; Fig. 4, a plan view; Fig. 5, a vertical cross-view of a floating jetty for collecting and directing the water into and upon the motor to increase the rapidity of the current; and Fig. 6, a plan view of the jetty, showing its floats and cross-stays.

Similar letters refer to similar parts throughout the several views.

A A A are a series of hollow air-tight floating cylinders, which in number may be two or more, (or one alone may be employed, but not to so great an advantage.) These floating cylinders may be of any required length, from ten to a hundred feet, and they are to be of such diameter as to nearly float not only themselves but all the rest of the device.

*a a a* are gudgeons fastened to the ends of the floating cylinders A A A, but which do not support the weight of the cylinders, but which are employed only to secure their (the cylinders') relative position to each other by passing through and being held in the connecting cross-bar *a' a'*.

B B B B are series of screw-blades (such in form and twist as are employed for the propulsion of steamships) secured to the surface of the floating cylinders A A A, each series being so arranged on the floating cylinders that the several series will alternate each other in position instead of standing in a continuous line with each other. These screw-blades and the cylinders upon which they are mounted, taken together, I will term the "floating motors," and which are made in such relative proportions as to size and weight that their combined weight is a little greater than their buoyancy in water. To keep these several motors from sinking, and yet to submerge them, (in order to obtain their maximum work,) I rigidly attach to and above them, by means of the connecting iron straps *c c c*, Figs. 1 and 2, an adjustable floating cylinder C, which prevents the device from sinking, as indicated by the "water-line" in Fig. 2; but in times of the flow of ice the whole apparatus can be lowered below the ice by allowing water to enter into the adjustable floating cylinder C, as indicated by the "ice-line" in Fig. 2.

To provide against the screw-blades B B B striking the bed of the river when it (the device) is lowered to escape the flow of ice, I suspend on the two ends of the apparatus a light iron frame *a'' a'' a''*, (best seen in Fig. 2,) which I will term the "ground-frame," and which is attached to the connecting cross-bar *a' a'* and the gudgeons *a a a*, the two said ground-frames (one at either end) being connected together (to keep them in vertical position) by the longitudinal rod or rods *c'*, Fig. 1. After the season of the flow of ice the device can, if desired, be elevated to the upper portion of the stream by means of drawing the water out of the adjustable floating cylinder C.

D D D is a strong iron holding-frame, to which the several floating motors are attached, and which is provided with a heavy anchor-chain *d*, Figs. 1 and 4, for holding and securing the apparatus to some suitable anchorage, either in the river or on the banks of the same. The connection between the holding-frame D D D and the rest of the apparatus consists of ball-joints E, Figs. 1 and 3, a part of each of which ball-joints consists of an enlarged extension of the gudgeons $a$ $a$ $a$ on the front end of the floating motors.

F F (seen in Fig. 2) are eyes, to which are fastened suitable guy chains or cables, the opposite ends of which are fastened to suitable anchors, or to the shores of the stream, to hold the apparatus in the desired fixed position in the river. To combine the rotary action of the several floating motors, (consisting of the floating cylinders A A A and their screw-blades B B B,) the several said cylinders are connected together at the rear end of the apparatus by belt chains or suitable wire cables G G, which pass around the ends of the floating cylinders A A A. (Seen in Figs. 2 and 4.) To convey the power of the apparatus to the bank or shore of the stream, a suitable wheel H, Fig. 2, is fastened upon the rear end of one (preferably the central one) of the floating cylinders A A A, which carries a suitable wire cable $h$ $h$, Figs. 2 and 4, to some corresponding wheel connected with machinery located on the shore of the river.

Figure 6:
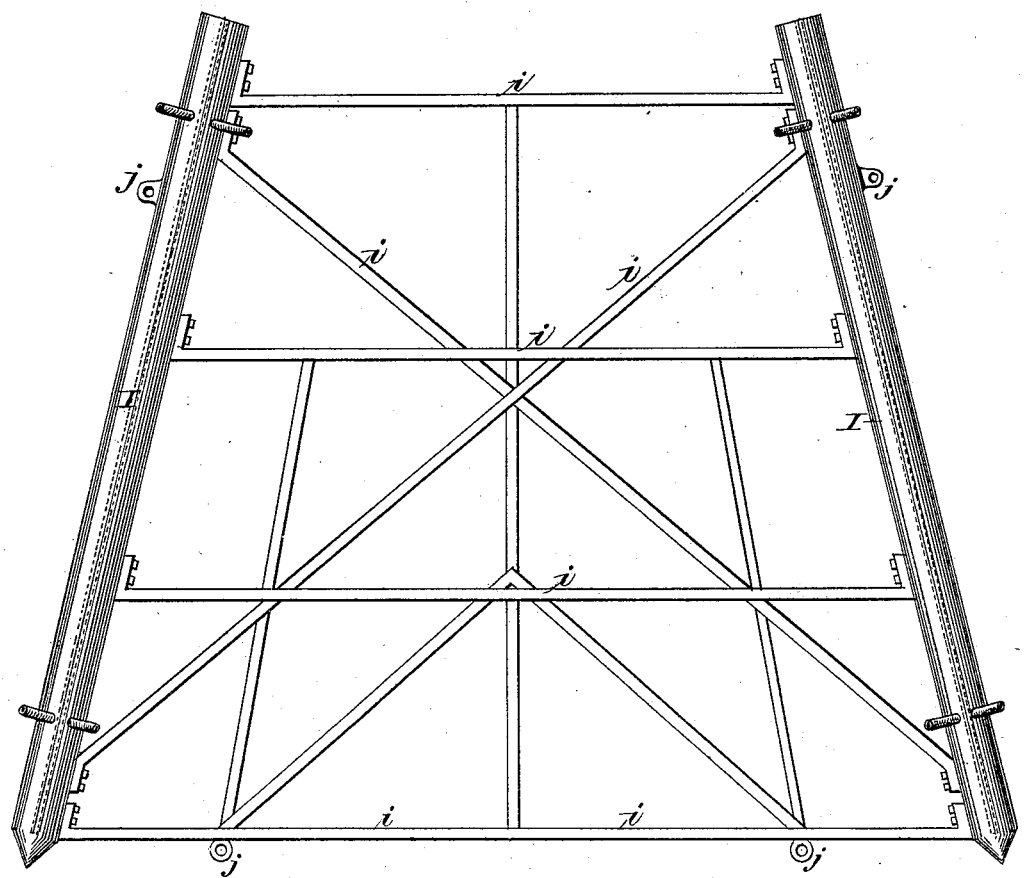

Figs. 5 and 6 are views of a floating jetty, in which I I represent two long floating cylinders, which I will term "jetty-cylinders," having bolted to their lower sides, throughout their length, a thin plate of iron J J, which we will term "jetty-blades," extending down into the water as far as do the screw-blades B B B. These jetty-floats and thin blades are secured to each other by a system of cross-braces $i$ $i$ $i$, holding them (the jetty floats and blades) in such a position to each other that at the narrowest end of the jetty the space between the two jetty-cylinders I I and jetty-blades J J will be but a little more than the combined transverse diameters of the blades of the floating motors. The other ends of the jetty cylinders and blades are to be placed at a much greater distance from each other, depending upon the length of the same, as they may be made as long as may seem desirable, it being the object of the floating jetty to divert, converge, and so increase the current of water toward and upon the floating motors.

The floating jetty, of course, is to be anchored and guyed in such a position in front of the floating motors as to bring the narrow end of the same in front of and near to the front end of the said motors, which is accomplished by attaching suitable chains or cables to the eyes $j$ $j$ $j$, Figs. 5 and 6, and by securing the opposite ends of the chains or cables to suitable anchorages or to the shores of the river. Whenever the floating motors are lowered to the bottom of the stream, to avoid the ice, the jetty is also lowered by allowing water to flow into the jetty-cylinders I I, and when it is desired to raise the jetty the water is to be drawn out of the same.

A single motor, consisting of one floating cylinder and having the screw-blades B B B attached to it, may be employed, with an adjustable floating cylinder C mounted above it; but two, three, or more of the floating motors combined together, as described, are preferable.

Having described the various parts of my device and their respective functions, any further description of the operation of my invention is hardly necessary more than to suggest that when the apparatus is anchored or otherwise moored in the river-current the water itself buoys up the apparatus, so as to cause no friction on the gudgeons $a$ $a$ $a$ or elsewhere more than results from the weight of the ground-frame $a''$ $a''$ $a''$, suspended on the gudgeons $a$ $a$ $a$, and the ball-joints E E E.

I may further state that the nature of the construction of my device does not limit its possible magnitude as to the diameter and length of its motors where ample depth and width of stream can be obtained. Of course its power as a motor will depend upon the length, diameter, and number of the floating motors employed and combined together, together with the depth and velocity of the current of water in which it is submerged. I will also add that it is a well-known law of mechanics that this class of motors, dependent upon the velocity of currents of water, like those known as "windmills," and dependent upon the velocity of wind, are superior to any other class of rotary motors, either horizontal or vertical, on which the current is applied to only one side of the motor, for the reason that the opposite side must move against the current while the other side is moving along with the current or force applied, while in the class of motors to which my device belongs every part of the screw-blades is effective and does not recede from or move against the force applied.

My invention being thus set forth, what I claim as new and useful, and desire to secure by Letters Patent, is—

1. In a device for utilizing currents of water as a motive power, the combination of the floating motors consisting of the hollow floating cylinders A A A, having the screw-blades B B B, the adjustable floating cylinder C, having suitable inlets and outlets for the ingress and egress of water and air, the connecting-bars $a'$ $a'$ $a'$, and ground-frame $a''$ $a''$ $a''$, whereby the entire device, by introduction of water into the cylinder C, is lowered to the bed of the river, and by pumping the water out of the said cylinder C the entire device is again elevated to or near the surface of the river, and whereby when the device is lowered to the bed of the river the blades B B B are prevented by the ground-frame $a''$ $a''$ $a''$ from striking the ground, substantially in the manner and for the purpose set forth.

2. In a device for utilizing currents of water as a motive power, the combination of the floating motors consisting of the hollow floating cylinders A A A, having the screw-blades B B B, the adjustable floating cylinder C, having suitable inlets and outlets for the ingress and egress of water and air, the connecting-bars $a'$ $a'$ $a'$, and ground-frame $a''$ $a''$ $a''$, the connecting-chains G G, cable-wheel H, and cable $h$ $h$, whereby the device can be lowered to the bed of the river by the introduction of water into the adjustable cylinder C and again raised to the surface of the river by the removal of the water from and the introduction of air into the said adjustable cylinder, substantially in the manner and for the purpose described.

3. In a device for utilizing currents of water as a motive power, the combination of the floating motors consisting of the hollow floating cylinders A A A, having the screw-blades B B B, the adjustable floating cylinder C, having suitable inlets and outlets for the ingress and egress of water and air, the connecting-bars $a'$ $a'$ $a'$, and ground-frame $a''$ $a''$ $a''$, the connecting-chains G G, cable-wheel H, cable $h$ $h$, the floating jetty consisting of the two converging hollow floating cylinders I I, having the jetty-blades J J, cross-bars $i$ $i$ $i$, and suitable inlets and outlets for the ingress and egress of water and air, whereby the said jetty and the said floating cylinders A A A can be simultaneously lowered to the bed of the river by the introduction of water into the adjustable cylinder C and into the jetty-cylinders I I, and then again simultaneously raised to the surface of the river by the removal of the water from and the introduction of air into the said cylinders C and I I, substantially as and for the purpose set forth.

FRANK G. JOHNSON.

Witnesses:
GEORGE H. DAILY,
FRANK R. JOHNSON.